Dec. 9, 1958   H. C. OVSHINSKY   2,863,160
THREADING TOOL SPINDLE FEED MEANS RECIPROCABLE
AT A RATE IN EXCESS OF THE LEAD
OF THE THREADING TOOL
Filed April 14, 1955
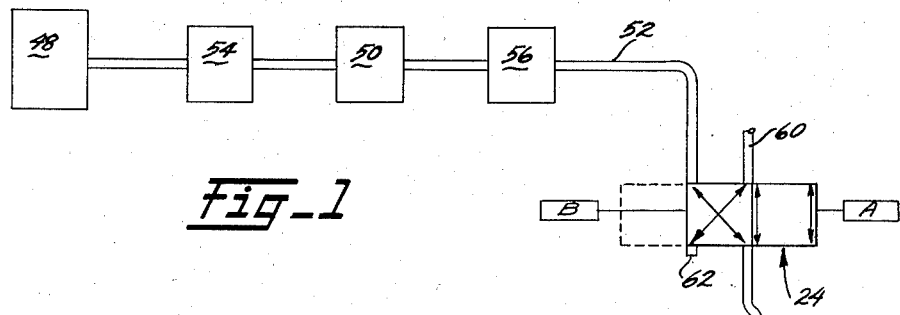
Fig_1
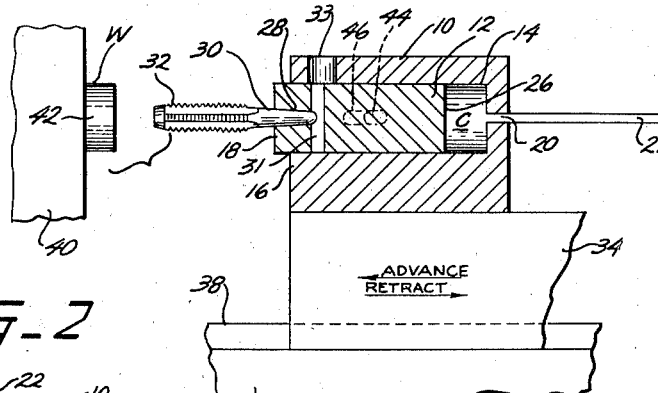
Fig_2
Fig_4
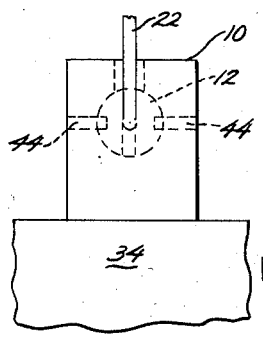
Fig_3
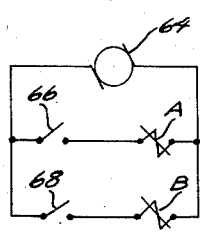
INVENTOR.
HERBERT C. OVSHINSKY
BY Roger B. McCormick
ATTORNEY

United States Patent Office 2,863,160
Patented Dec. 9, 1958

2,863,160

THREADING TOOL SPINDLE FEED MEANS RECIPROCABLE AT A RATE IN EXCESS OF THE LEAD OF THE THREADING TOOL

Herbert C. Ovshinsky, Detroit, Mich.

Application April 14, 1955, Serial No. 501,242

6 Claims. (Cl. 10—139)

This invention relates to a holder for thread cutting tools and, more specifically, to a threading tool holder which may be used to particular advantage in a lathe or other machine tool wherein provision is made to support a work piece and a cutting tool for relative rotation while advancing and/or withdrawing one with respect to the other along the axis of rotation.

In forming threads on a work piece which is rotated relative to an axially advancing thread cutting tool, the said tool must advance an amount equal to the pitch distance of the desired thread during each rotation of the work piece. This rate of axial movement of the cutting tool will hereinafter be referred to as the "pitch rate." It is well known that a thread cutting tool, such as a tap for internal threads or a die for external threads, tends to adjust its advance to the pitch rate. Accordingly, if the thread cutting tool is resiliently mounted or held, the mounting or holding means can be advanced on the work piece at other than the pitch rate and the threads will nonetheless be properly formed.

One known type of tool mount which takes advantage of the inherent ability of the cutting tool to adjust its rate comprises a holder having a bore wherein the cutting tool or cutting tool shank can move axially and thus move relative to its mount or holder. A spring is located in the bore behind the cutting tool to provide resilient driving force sufficient to institute thread cutting when the holder is advanced on the work piece parallel to its axis of rotation. The tool mount is advanced on the work at a rate in excess of the pitch rate and the cutting tool is thrust into the bore, thereby compressing the spring, but the said cutting tool will advance relative to the work at the pitch rate. While the aforedescribed conventional arrangement may provide for proper thread cutting, trouble is encountered in retracting or withdrawing the cutting tool from the work.

More specifically, if the tool holder is withdrawn at less than the pitch rate, the compressed spring tends to force the cutting tool axially in the direction of the work, tending to mutilate the threads. It has been found that the mutilation is most pronounced on the outer convolution of the thread (the first convolution cut). The spring force may cause the cutting tool to push the crest of the outer convolution toward the adjacent convolution. If the tool holder is withdrawn at a rate in excess of the pitch rate, the spring force is removed and the cutting tool is dragged over the cut threads. This may cause the cutting tool to pull the crest of the outer convolution outwardly.

As a result, thread mutilation can only be completely avoided by retracting the tool holder at precisely the pitch rate. This means that it is necessary to have accurate and complex gearing or other motion transmitting means interconnecting the work piece holder and the tool mount so that the tool can be retracted at the pitch rate.

It is the general object of this invention to provide a holder for a threading tool which will take advantage of the tool's inherent ability to adjust its rate and which will eliminate the disadvantages usually associated with generally similar tool holders.

Another object of the invention is to provide a tool holder capable of so supporting a thread cutting tool that the holder can be advanced and retracted with respect to the work piece at other than the pitch rate, and at rates which may vary over a relatively wide range, while at the same time cutting highly satisfactory threads and leaving the said threads unmutilated.

An additional important object is to provide a simple tool holder which need not have a drive connection with the means holding and rotating the work piece.

Other, more specific objects as well as advantages of the invention will become apparent to those skilled in the art from the following description of the attached drawing in which, Fig. 1 is a schematic view of the tool holder and associated apparatus, showing a central longitudinal section through the holder;

Fig. 2 is a right-hand end view of the tool holder shown in Fig. 1;

Fig. 3 is the wiring diagram of the control circuit for automatically operating the pneumatic valve associated with the tool holder; and Fig. 4 is a view similar to Fig. 1 showing an alternative form of construction.

The main elements of the tool holder per se comprise a generally rectangular tool block 10 and a piston 12 which is freely slidable within a bore 14 provided in the said block. The bore 14 is open at one end 16 of the block 10 so that one end 18 of the piston 12 may project therefrom when the said piston is moved toward the said one end of the bore. The other end of the bore 14 is closed except for a passageway 20 communicating with a flexible conduit 22 which extends to a flow control valve indicated generally by the reference numeral 24. As will be described in greater detail hereinafter, the valve 24 is utilized to control the flow of air under pressure through the conduit 22 into and out of the bore 14. At the closed end of the said bore a chamber C is defined between said closed end and the inner end 26 of the piston which end will sometimes hereinafter be referred to as the "head" end thereof.

In accordance with the present invention, the exposed or projecting end 18 of the piston 12 is provided with means for detachably securing a thread cutting tool. For purposes of illustration, the said means has been shown as comprising a tapered opening 28 which will receive the tapered shank 30 of a conventional thread cutting tool such as a tap 32 which may be used for cutting internal threads in a work piece W. It will be observed that the end of the tapered shank 30 projects into a transverse opening 31 in the piston 12 and it will also be noted that an aperture 33 in the tool block 10 communicates with the opening 31. A pin (not shown) can be thrust into the openings 33 and 31 to engage the end of the tool shank 30 to dislodge the tool 32 from the tapered opening 28.

As shown in Fig. 1, the tool block 10 may be mounted on a slide 34 forming a part of a power driven machine tool such as a lathe which includes a bed 36 having a plurality of ways such as shown at 38 for reciprocation of the slide 34 therealong. The lathe rotatably supports a chuck 40 which will hold the work piece W in axial alignment with the tap 32. For a more complete understanding of the present invention, it can be assumed that the machine tool is power driven, having drive means for rotating the chuck 40 and thus the work piece W at a selected or known rate and it can also be assumed that the machine tool has automatically operable drive means for advancing the slide 34 toward the chuck 40 as indicated by one arrow or withdrawing the slide 34 in the opposite direction as shown by another arrow parallel to the axis of rotation of the said chuck. As will be readily apparent from the drawing, when the slide 34 is advanced towards the chuck 40, the tap 32 will be received within a hole 42 provided in the work piece W on the axis of chuck rotation so that the said tap can cut threads in the wall of the said hole. It will also be apparent that a thread cutting die may be secured by the piston 12 to project from the end 18 thereof to engage and embrace the work piece held within the chuck 40 so as to cut external threads on its periphery.

In further accord with the present invention, means are provided for supplying a fluid under pressure to the chamber C so that the piston 12 will be biased within the tool block 10 toward the chuck 40 and the work piece W. While other fluids may be used, air is the preferred medium. It will be seen that fluid under pressure in the chamber C exerting force on the head end 26 of the piston 12 will tend to thrust the piston out of the bore 14. However, sliding movement of the piston 12 within the said bore is limited by means of a pair of stops 44, 44 which are detachably inserted through suitable openings in the opposite sides of the block 10 to engage within a pair of diametrically opposed keyways 46, 46 which extend longitudinally of the piston 12 on its outer periphery. As shown in Fig. 1, the chamber C is filled with compressed air which forces the piston 12 forwardly so that the stops 44, 44 abut the rearmost ends of the keyways 46, 46.

When the slide 34 is advanced toward the chuck 40 and the work piece W, the tap 32 is forced into the opening 42 in the said work piece with the force of the compressed air in the chamber C applied to the head end 26 of the piston 12 plus the frictional force tending to retard sliding movement between the said piston and the tool block 10. The aforesaid frictional force has been found to be so small as to have no noticeable effect on thread cutting and will not in any way cause thread mutilation, and, therefore, frictional forces will not be given further consideration herein. The compressed air force on the piston 12 should be sufficient to cause initial cutting of the opening 42 by the tap 32 but should not be so great as to prevent rearward movement of the piston 12 in the bore 14. The inherent ability of the tap 32 to adjust its rate of advance to the rotation of the work W will cause the piston 12 to move rearwardly in the bore 14 if the block 10 and slide 34 are advanced in excess of the pitch rate.

The matter of "rates" can best be considered in connection with a specific example. Assuming that the chuck 40 is rotated at 100 R. P. M. and assuming that the tap 32 has 10 teeth per inch so as to cut 10 thread convolutions per inch, it will be quite apparent that the tap 32 should advance into the opening 42 at the rate of 10 inches per minute. In accordance with the present invention, the slide 34 and tool block 10 need not be advanced at the 10 in. per min. pitch rate, but can be advanced at a rate in excess of the pitch rate, as for example at 11 inches per minute. In the example, the piston 12 will be thrust rearwardly in the bore 14 against the compressed air cushion provided in the chamber C at the rate of one inch per minute.

This lagging of the tap 32 and relative rearward movement of the piston 12 in the bore 14 will continue as the slide 34 advances. The lag is stopped only when the stops 44, 44 engage the front ends of the keyways 46, 46. Accordingly, the keyways 46, 46 should be cut of sufficient length to permit the tap 32 to lag for the full length of the hole 42 to be threaded while the slide is advanced at a rate well in excess of the pitch rate. Assuming that 1 inch of threads are to be cut in the hole 42 and that the slide can be advanced by as much as one inch per minute in excess of the pitch rate in the aforesaid example wherein the pitch rate is 10 inches per minute to cut 10 threads per inch with a chuck speed of 100 R. P. M., the keyways 46, 46 should be sufficiently long to permit the stops or keys 44, 44 to travel 1/10 inch therein before engaging the front ends of said keyways. If more than 1/10 inch rearward travel of the piston 12 is provided by extending the keyways 46, 46, the slide 34 can be advanced at more than one inch per minute in excess of the pitch rate for the one inch of thread cutting or the slide 34 can be advanced at one inch per minute in excess of the pitch rate while cutting more than one inch of threads in the hole 42.

It will be readily understood that it is only necessary to select a slide advance rate equal to or in excess of the pitch rate and it will be understood that a relatively wide latitude of slide rate selection is permitted. It will be further understood that care should be exercised in selecting the pressure for the air confined within the chamber C so that it will support the piston and tap for initial cutting without undesirably opposing relative rearward movement of the piston when the tap lags. It has been found that pressure selection for the purposes stated is not extremely critical and, in fact, varies over a substantial range.

The means for supplying and controlling the air pressure comprises an air compressor 48 or other pressurized source for air and a pressure regulator 50, in addition to the flow control valve 24 and the conduit 22. The pressure regulator valve 50 is located in a conduit 52 extending between the air compressor 48 and the flow control valve 24 so as to regulate the pressure of air flow into and through the valve 24 into the conduit 22 and the chamber C. Preferably, an air filter 54 is located in the line 52 between the compressor 48 and the pressure regulating valve 50. It is also preferable to provide an air lubricator 56 in the line 52 between the pressure regulating valve 50 and the flow control valve 24 so that air admitted to the valve 24 and to the piston chamber C will carry a lubricant which will avoid deterioration and wear on the operating parts such as the piston 12 and tool block 10.

The structure and operation of the flow control valve 24 and the operation of the air supply system will be described in greater detail in connection with an explanation of the overall operation of the tool holder.

As thus far described, the tool holder of this invention functions in a manner generally similar to the conventional tool holder which was previously mentioned. However, the tool holder of this invention can be retracted or withdrawn at other than the pitch rate to withdraw the cutting tool without causing the cutting tool to mutilate the cut threads.

When the threads have been cut in the hole 42 by the tap 32, the lathe is de-energized to stop rotation of the chuck 40 and work piece W and the air chamber C in the tool block 10 is vented to atmosphere. Then, in retracting the tap 32 the lathe is energized to rotate the chuck 40 and work piece W in the opposite direction. At substantially the same time, the slide 34 is moved rearwardly at the pitch rate or in excess thereof. Assuming rearward movement of the slide to be in excess of the pitch rate, the tap 32, by reason of its inherent ability to follow the cut threads at the pitch rate, will lag behind the slide. Since the chamber C has been purged of pressurized air, the lagging tap and piston 12 can be said to be freely floating and will not be subjected to forces which might conceivably cause the tap to mutilate the threads.

It will be readily understood that the same rate range is permitted in retracting the tool slide 34 as in advancing the slide, assuming of course that the chuck 40 and work piece W are rotated at the same speeds during slide advance and retraction. It will also be understood that by reason of the rate variations permitted in advancing and retracting the tool slide it is not necessary to have precisely timed driving connections between the work holding chuck and the slide. In fact, it is not essential to successful operation to have any driving connection between the chuck and the slide. For example, the slide can be independently driven as by an hydraulic system or the like.

It is believed that the greatest benefit will be derived from this invention in automatic control of the air supply to the tool holder. By incorporating the valve 24 in the pressurized air line and by incorporating the valve control system shown in Fig. 3, the air supply can be controlled in accordance with the position of the tool slide and during reciprocation thereof.

The valve 24 is a two position valve adapted for operation by a pair of solenoids A and B. When solenoid A is energized, the valve 24 is positioned as shown by the full lines in Fig. 1 thereby connecting the lines 52 and 22 to supply pressurized air to the chamber C. When solenoid B is energized, the valve 24 is shifted from the full line position to the position shown by the broken lines in Fig. 1 thereby connecting the line 22 to a vent line 60 to vent the chamber C while the pressure line 52 is connected to a closed line 62.

In Fig. 3 there is shown a simple wiring diagram for the valve solenoids. As shown, the solenoids A and B are connected in parallel circuits to a power source 64, the "A" circuit including a limit switch 66 and the "B" circuit including a limit switch 68. Since the chamber C is to be pressurized for thread cutting after the slide 34 is retracted, it will be readily understood that one convenient arrangement for automatic control of the valve will include locating the limit switch 66 on the lathe bed 36 so that it can be closed by engagement with the slide 34 when the said slide is retracted. Since the chamber C is to be vented after or when the slide is advanced, the limit switch 68 should be located on the lathe bed 36 for engagement by the slide 34 when the slide has been advanced a selected amount. It is preferred that the limit switches 66 and 68 be biased to open position so that they will automatically open after the slide has been in engagement therewith. This will prevent simultaneous operation of the solenoids A and B and will assure selective positioning of the valve 24. With the aforedescribed limit switch arrangement, air flow control is effected automatically and the tool slide 34 can be reciprocated to advance and retract the cutting tool relative to the chuck and work piece without diverting the operator's attention to valve operation.

The aforedescribed embodiment of the invention encompasses an application where the work piece is rotated and the thread cutting tool is not rotated. The alternative form shown in Fig. 4 incorporates the invention in a construction which provides for rotation of the thread cutting tool. In many respects, the alternative form is similar to the first described embodiment. For example, the tool holder may be mounted on the same tool slide 34 for reciprocation over the ways 38, 38. While the tool holder in the alternative form is adapted to support a thread cutting tool such as the tap 32 in substantially the same way, the said tool holder is different in form. That is, there is provided an outer block 70 which is fixedly secured to the tool slide 34 to rotatably support an inner block 72 which has a bore 74 slidably receiving the tool support piston 76. It will be observed that the outer block 70 has a longitudinally extending bore 78 wherein a pair of anti-friction bearing units 80, 80 are located in spaced apart relationship to rotatably mount the inner block 72. The inner block 72 projects through both ends of the bore 78, the forwardly projecting end of said inner block containing the tool-receiving piston 76 in the manner previously described, and the rearward end of the inner block 72 having means for a rotating drive connection. The said drive connecting means may comprise a driven belt 82 and a pulley 84 fixed to the extending rear end of the inner block. The air supply for the bore 74 in the inner block 72 is provided through a flexible conduit 86 which terminates in a non-rotating coupling 88 embracing a reduced diameter portion 90 on the rearward end of the inner block 72. A channel or passageway 92 is provided in the inner block 72 to effect communication between the non-rotating coupling 88 and the bore 74.

It will be quite apparent that the inner block 72 will rotate as the slide is reciprocated to and from a work piece. It should be apparent from the foregoing description that the tool-supporting piston 76 is capable of axial movement relative to the inner block 72. The limit of axial movement is defined by a pair of keys or stops 94, 94 engaged with a pair of keyways 96, 96, the said stops and keyways being similar to their counterparts in the previously described embodiment. It should also be apparent that the rotating movement of the inner block 72 is transmitted to the piston 76 by means of stops 94, 94 engaging within the keyways 96, 96.

While the embodiment shown in Fig. 4 has been described as mounted on a tool slide which is reciprocated relative to the work piece, it should be understood that the rotating tool holder of Fig. 4 can be fixed against axial or longitudinal movement while a non-rotating or rotating work piece is axially advanced and retracted with respect to the cutting tool.

It should be further understood that various other modifications and alternative forms of construction can be accomplished within the scope of the invention and, therefore, it is not my intent to limit the invention to the specific embodiments which are shown and described otherwise than indicated by the claims which follow.

I claim as my invention:

1. In a thread cutting tool holder for a machine tool of the type having means for supporting a workpiece, means for supporting a tool holder, and means for effecting relative rotation between the workpiece and the tool holder while one is reciprocated with respect to the other parallel to the axis of rotation, the combination comprising a support block having a bore substantially parallel to the said axis which bore has a closed end and an open end facing toward the workpiece, a piston reciprocable in said bore, means on said piston for supporting a thread cutting tool in alignment with the said axis and extending toward the workpiece, means in said bore for limiting the movement of the said piston toward the open end and toward the closed end of the bore and for preventing rotation of the piston in the bore, a source of compressed fluid, means defining a passageway connecting said source and said closed end of the bore to admit fluid under pressure thereto whereby to resiliently bias said piston toward the open end of the bore, and a valve disposed in said passageway, said valve being selectively operable to introduce compressed fluid to said bore or to vent said bore and said support block being movable toward the workpiece at a rate in excess of the thread cutting pitch rate while compressed fluid is in the bore and the support block being movable away from the workpiece at a rate in excess of the thread cutting pitch rate while the bore is vented.

2. In a thread cutting tool holder for a machine tool of the type having means for supporting a workpiece, means for supporting a tool holder, and means for effecting relative rotation between the workpiece and the tool holder while one is reciprocated with respect to the other parallel to the axis of rotation, the combination comprising a support block having a bore aligned with the said axis which bore has a closed end and an open end facing toward the workpiece, a piston reciprocable in said bore, means on said piston for supporting a thread cutting tool to project through said open end of the bore in alignment with the said axis, means in said bore for limiting the movement of the said piston toward the open end and toward the closed end of the bore and for preventing rotation of the piston in the bore, a source of compressed air, means defining a passageway connecting said source and the closed end of the bore to admit fluid under pressure thereto whereby to resiliently bias said piston toward the open end of the bore, and a valve disposed in said passageway, said valve being selectively operable to introduce compressed air to said bore or to vent said bore and said support block being movable toward the workpiece at a rate in excess of the thread cutting pitch rate while compressed fluid is in the bore and the support block being movable away from the workpiece at a rate in excess of the thread cutting pitch rate while the bore is vented.

3. In a thread cutting tool holder for a machine tool of the type having means for supporting a workpiece, means for supporting a tool holder, and means for effecting relative rotation between the workpiece and the tool holder while one is reciprocated with respect to the other parallel to the axis of rotation, the combination comprising a support block having a bore substantially parallel to the said axis which bore has a closed end and an open end facing toward the workpiece, a piston reciprocable in said bore, means on said piston for supporting a thread cutting tool in alignment with the said axis and extending toward the workpiece, means in said bore for limiting the movement of the said piston toward the open end and toward the closed end of the bore and for preventing rotation of the piston in the bore, a source of compressed fluid, means defining a passageway connecting said source and the closed end of the bore to admit fluid under pressure thereto whereby to resiliently bias said piston toward the open end of the bore, an electrically operated valve disposed in said pasageway which valve in one position will introduce compressed fluid to said bore and in another position will vent said bore, and switch means connected to said valve and operable in sequence during relative reciprocation between the workpiece and the tool holder to place said valve in said first position and in said second position in sequence, the support block being movable toward the workpiece at a rate in excess of the thread cutting pitch rate while compresed fluid is in the bore and the support block being movable away from the workpiece at a rate in excess of the thread cutting pitch rate while the bore is vented.

4. In a thread cutting tool holder for a machine tool of the type having means for supporting a workpiece, means for supporting a tool holder, and means for effecting relative rotation between the workpiece and the tool holder while one is reciprocated with respect to the other parallel to the axis of rotation, the combination comprising a support block having a bore aligned with said axis, which bore has a closed end and an open end facing toward the workpiece, a piston reciprocable in said bore, means on said piston for supporting a thread cutting tool to project through the open end of the bore in alignment with said axis, means in said bore for limiting the movement of the said piston towards the open end and toward the closed end of the bore and for preventing rotation of the piston in the bore, a source of compressed air, means defining a passageway connecting said source and the closed end of the bore, an electrically operable valve disposed in said passageway and including a pair of solenoids one of which when energized will position said valve to introduce compressed air to said bore and the other of which solenoids when energized will position said valve to vent said bore, and a pair of switches being respectively connected to said solenoids and constructed and arranged for sequential operation during relative reciprocation between the tool holder and the workpiece, one of said switches being adapted when closed to energize said one solenoid and the other of said switches being adapted when closed to energize said other solenoid and the support block being movable toward the workpiece at a rate in excess of the thread cutting pitch rate while compressed fluid is in the bore and the support block being movable away from the workpiece at a rate in excess of the thread cutting pitch rate while the bore is vented.

5. In a thread cutting tool holder for a machine tool of the type having a rotatable chuck holding a workpiece, and a tool slide reciprocable toward and away from the chuck parallel to the chuck axis, the combination comprising a support block reciprocable with the slide and having a bore substantially parallel to the chuck axis which bore has a closed end and an open end facing toward the chuck, a piston reciprocable in said bore, means on said piston for supporting a thread cutting tool in alignment with the chuck axis and extending toward the workpiece, means in said bore for limiting the movement of the said piston toward the open end and toward the closed end of the bore and for preventing rotation of the piston in the bore, a source of compressed fluid, means defining a passageway connecting said source and the closed end of the bore, an electrically operable valve disposed in said passageway, and electrical switch means connected to said valve and constructed and arranged for sequential operation during reciprocation of said tool slide to sequentially condition the said valve to introduce compressed fluid to said bore and to vent said bore, and said support block being movable toward the workpiece at a rate in excess of the thread cutting pitch rate while compressed fluid is in the bore and the support block being movable away from the workpiece at a rate in excess of the thread cutting pitch rate while the bore is vented.

6. In a thread cutting tool holder for a machine tool having a chuck holding a workpiece and a tool slide reciprocable toward and away from the chuck parallel to the chuck axis, the combination comprising a support block reciprocable with the slide and having a bore substantially parallel to the chuck axis which bore has a closed end and an open end facing toward the chuck, a piston reciprocable in said bore, means on said piston for supporting a thread cutting tool in alignment with the said axis and extending toward the chuck, means in said bore for limiting the movement of the said piston toward the open end and toward the closed end of the bore and for preventing rotation of the piston in the bore, a source of compressed air, means defining a passageway connecting said source and the closed end of the bore, an electrically operated valve disposed in said passageway and including a pair of solenoids one of which solenoids is adapted when energized to condition said valve to introduce compressed air to the bore and the other of which solenoids is adapted when energized to condition said valve to vent said bore whereby the support block can be advanced toward the workpiece at a rate in excess of the thread cutting pitch rate while compressed fluid is in the bore and the support block can be retracted at a rate in excess of the pitch rate while the bore is vented, and a pair of switches connected, respectively, to said solenoids, said switches being sequentially operable during reciprocation of the tool slide to energize said one solenoid and said other solenoid.

References Cited in the file of this patent

UNITED STATES PATENTS

| | | |
|---|---|---|
| 1,124,167 | Phillips | Jan. 5, 1915 |
| 2,089,930 | Carlson | Aug. 10, 1937 |
| 2,191,915 | Protin | Feb. 27, 1940 |
| 2,244,185 | Bakewell | June 3, 1941 |
| 2,532,207 | Treglown | Nov. 28, 1950 |
| 2,587,352 | Manning | Feb. 26, 1952 |
| 2,616,103 | Stecher | Nov. 4, 1952 |
| 2,768,393 | Sayce | Oct. 30, 1956 |